(12) United States Patent
Wipf (10) Patent No.: US 8,720,351 B1
(45) Date of Patent: May 13, 2014

(54) GAUGE WHEEL WITH IMPROVED WEAR CHARACTERISTICS

(76) Inventor: Danny Wipf, Lake Andes, SD (US)

( * ) Notice: Subject to any disclaimer, the term of this patent is extended or adjusted under 35 U.S.C. 154(b) by 0 days.

(21) Appl. No.: 13/431,169

(22) Filed: Mar. 27, 2012

(51) Int. Cl.
*A01B 49/04* (2006.01)
*A01C 5/00* (2006.01)
*A01C 13/00* (2006.01)

(52) U.S. Cl.
USPC ............................. 111/137; 172/578; 172/22

(58) Field of Classification Search
USPC ........ 172/578, 22, 610, 15, 14; 111/137, 164, 111/167, 163, 157, 149; 56/504, 16.7, 255
See application file for complete search history.

(56) References Cited

U.S. PATENT DOCUMENTS

| | | | | |
|---|---|---|---|---|
| 391,045 | A * | 10/1888 | Hatch | 301/43 |
| 1,419,350 | A * | 6/1922 | Beers | 301/44.1 |
| 2,730,856 | A * | 1/1956 | Mekalainas | 56/249 |
| 3,297,096 | A * | 1/1967 | Wooldridge | 172/464 |
| 4,374,500 | A * | 2/1983 | Westerfield | 111/164 |
| 4,408,551 | A * | 10/1983 | Keller et al. | 111/163 |
| 4,735,038 | A * | 4/1988 | Williams | 56/255 |
| 4,905,771 | A * | 3/1990 | Stark | 172/572 |
| 5,361,848 | A | 11/1994 | Fleischer | |
| 5,483,907 | A * | 1/1996 | Gaalswyk | 111/167 |
| 5,579,818 | A | 12/1996 | Hoppenheit | |
| D377,356 | S * | 1/1997 | Bruns | D15/28 |
| 5,595,130 | A | 1/1997 | Baugher | |
| 5,662,172 | A * | 9/1997 | Brown | 172/22 |
| D386,191 | S * | 11/1997 | Bruns | D15/28 |
| 6,095,065 | A | 8/2000 | Dietrich | |
| 6,101,800 | A * | 8/2000 | Juraco et al. | 56/504 |
| 6,644,223 | B2 * | 11/2003 | Prairie et al. | 111/137 |
| 6,752,094 | B1 * | 6/2004 | Truax | 111/135 |
| 6,761,120 | B2 | 7/2004 | Kovach | |
| 6,848,377 | B2 * | 2/2005 | Rylander et al. | 111/195 |
| 7,143,704 | B1 | 12/2006 | Gust | |
| 7,438,006 | B2 * | 10/2008 | Mariman et al. | 111/164 |
| D594,477 | S * | 6/2009 | Dawson et al. | D15/20 |
| 7,673,571 | B2 * | 3/2010 | Medernach | 111/121 |
| 7,938,074 | B2 * | 5/2011 | Liu | 111/200 |
| 8,015,933 | B2 * | 9/2011 | Schilling et al. | 111/129 |
| 8,047,301 | B2 * | 11/2011 | Friggstad et al. | 172/574 |
| 8,104,543 | B2 | 1/2012 | Hesla | |
| 8,186,287 | B2 * | 5/2012 | Schilling et al. | 111/69 |
| 8,215,867 | B2 * | 7/2012 | Juzva et al. | 404/121 |

(Continued)

*Primary Examiner* — Árpád Fábián-Kovács (74) *Attorney, Agent, or Firm* — Jeffrey A. Proehl; Woods, Fuller, Shultz & Smith, P.C.

(57) ABSTRACT

A gauge wheel including a center portion extending outwardly from the center of the wheel, and a rim portion positioned at an outer circumference of the wheel and having an inner surface and an outer surface at the outer side of the wheel with the rim portion having an outer circumferential surface extending between the inner surface and the outer surface of the wheel and extending along the outer circumference of the wheel. The wheel including a lip portion for contacting the disk, with the lip portion being on the inner side of the gauge wheel and extending from the inner surface of the rim portion, the lip portion tapering to a thin edge away from the inner surface. A plurality of lugs may be formed on the outer circumferential surface with the lugs being separated by valleys to cause the ground surface to rotate the wheel.

1 Claim, 7 Drawing Sheets

(56) References Cited

U.S. PATENT DOCUMENTS

| | | | |
|---|---|---|---|
| 8,272,339 B2 * | 9/2012 | Schilling et al. | 111/129 |
| 8,336,469 B2 * | 12/2012 | Preheim et al. | 111/185 |
| 8,347,798 B2 * | 1/2013 | Harnetiaux | 111/167 |
| 2005/0257871 A1 | 11/2005 | Hill | |
| 2006/0137795 A1 | 6/2006 | Hill | |
| 2008/0179940 A1 | 7/2008 | Hill | |
| 2009/0158981 A1 | 6/2009 | Jagow | |
| 2011/0185955 A1 | 8/2011 | Martin | |

* cited by examiner

GAUGE WHEEL WITH IMPROVED WEAR CHARACTERISTICS

BACKGROUND

1. Field

The present disclosure relates to gauge wheels and more particularly pertains to a new improved gauge wheel with one or more features for extending the useful life of the gauge wheel.

2. Description of the Prior Art

Planters and other similar agricultural implements include a disk for forming a furrow in the ground, and one or more gauge wheels positioned adjacent to the gauge wheel to set the depth of ground penetration by the disk. Both the disk and the gauge wheel are rotatably mounted on a frame of the planter. Gauge wheels for planters are typically formed of a steel center structure with a tire mounted on the perimeter of the center structure, and the tire is adapted to contact and rub against a portion of the disk as the disk and gauge wheel are rotated by contact with the ground surface as the planter moves across the field. The tire of the gauge wheel is formed of a compliant rubber or synthetic rubber material that is smooth along the outer perimeter surface and often includes an extension lip that conforms to a portion of the surface of the disk.

SUMMARY

In view of the foregoing types of gauge wheels now present in the prior art, the present disclosure describes a new improved gauge wheel with increased durability to extend the useful life of the gauge wheel.

In one aspect, the present disclosure relates to a gauge wheel for controlling a depth of ground penetration for a disk of a crop planter. The gauge wheel may have an inner side for positioning toward the disk and an outer side for positioning away from the disk. The gauge wheel may comprise a center portion extending outwardly from the center of the wheel, and a rim portion positioned at an outer circumference of the wheel. The rim portion has an inner surface and an outer surface at the outer side of the wheel, with the rim portion having an outer circumferential surface extending between the inner surface and the outer surface of the wheel and extending along the outer circumference of the wheel. The wheel may have a lip portion for contacting the disk, with the lip portion being on the inner side of the gauge wheel and extending from the inner surface of the rim portion. The lip portion may taper to a thin edge away from the inner surface. A plurality of lugs may be formed on the outer circumferential surface of the rim portion with the lugs being separated by valleys to cause the ground surface to rotate the wheel.

In another aspect, the disclosure relates to a gauge wheel for controlling a depth of ground penetration for a disk of a crop planter, with the gauge wheel having an inner side for positioning toward the disk and an outer side for positioning away from the disk. The gauge wheel may comprise a center portion extending outwardly from the center of the wheel, and a rim portion positioned at an outer circumference of the wheel. The rim portion has an inner surface and an outer surface at the outer side of the wheel, with the rim portion having an outer circumferential surface extending between the inner surface and the outer surface of the wheel and extending along the outer circumference of the wheel. The gauge wheel may also comprise a lip portion for contacting the disk, with the lip portion being on the inner side of the gauge wheel and extending from the inner surface of the rim portion and the lip portion tapering to a thin edge away from the inner surface. A plurality of lugs are formed on the outer circumferential surface of the rim portion with the lugs being separated by valleys to cause the ground surface to rotate the wheel. The rim portion and the lip portion of the wheel may be formed of a non-compliant material.

In another aspect, the disclosure relates to a crop planter comprising a frame, and a disk mounted on the frame, with the disk being rotatably mounted on the frame, the disk having a pair of opposite side surfaces. The planter may also include a gauge wheel controlling a depth of ground penetration for a disk of a crop planter. The gauge wheel may have an inner side positioned toward the disk and an outer side positioned away from the disk. The gauge wheel may comprise a center portion extending outwardly from the center of the wheel, and a rim portion positioned at an outer circumference of the wheel, with the rim portion having an inner surface and an outer surface at the outer side of the wheel. The rim portion may have an outer circumferential surface extending between the inner surface and the outer surface of the wheel and extending along the outer circumference of the wheel. The wheel may comprise a lip portion contacting at least a portion of a side of the disk, with the lip portion being on the inner side of the gauge wheel and extending from the inner surface of the rim portion, the lip portion tapering to a thin edge away from the inner surface. A plurality of lugs may be formed on the outer circumferential surface of the rim portion with the lugs being separated by valleys to cause the ground surface to rotate the wheel. The rim portion and the lip portion of the wheel may be formed of a non-compliant material.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

With reference now to the drawings, and in particular to FIGS. 1 through 7 thereof, a new improved gauge wheel embodying the principles and concepts of the disclosed subject matter will be described.

Applicant believes that conventional gauge wheels have an exceedingly short useful life, and must too frequently be replaced or repaired to maintain the functionality of the gauge wheel. Applicant has recognized that one of the most significant causes of the short life of the gauge wheel is caused by the periodic failure of the gauge wheel to rotate when the planter is moved across the field, and the wheel then simply slides across the surface of the field. The rotation of the gauge wheel is often impeded by the buildup of soil and mud about the wheel, and in particular between the wheel and the disk of the planter. Applicant has recognized that the smooth nature of the outer surface of the tire allows the wheel to slide if any significant resistance to rotation is encountered by the wheel, such as from the aforementioned mud. Further, the relatively soft and compliant nature of the tire of the conventional gauge wheel compounds the wear caused by the failure to rotate, as the \material is too easily worn when the wheel does not rotate. Applicant further believes that the problem has only been exacerbated by the use of BT crops which appear to leave tougher and more abrasive stover in the field that the gauge wheels pass through during planting in a low till or no till field.

Figure 1:
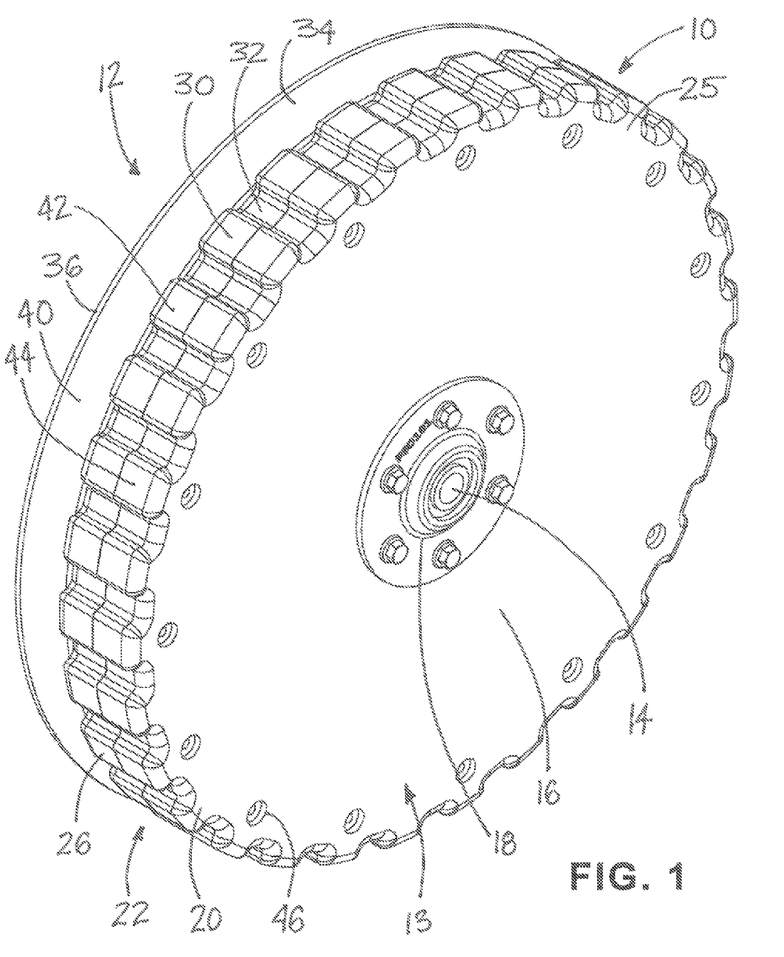
FIG. 1 is a schematic perspective view of a new improved gauge wheel according to the present disclosure.
Figure 2:
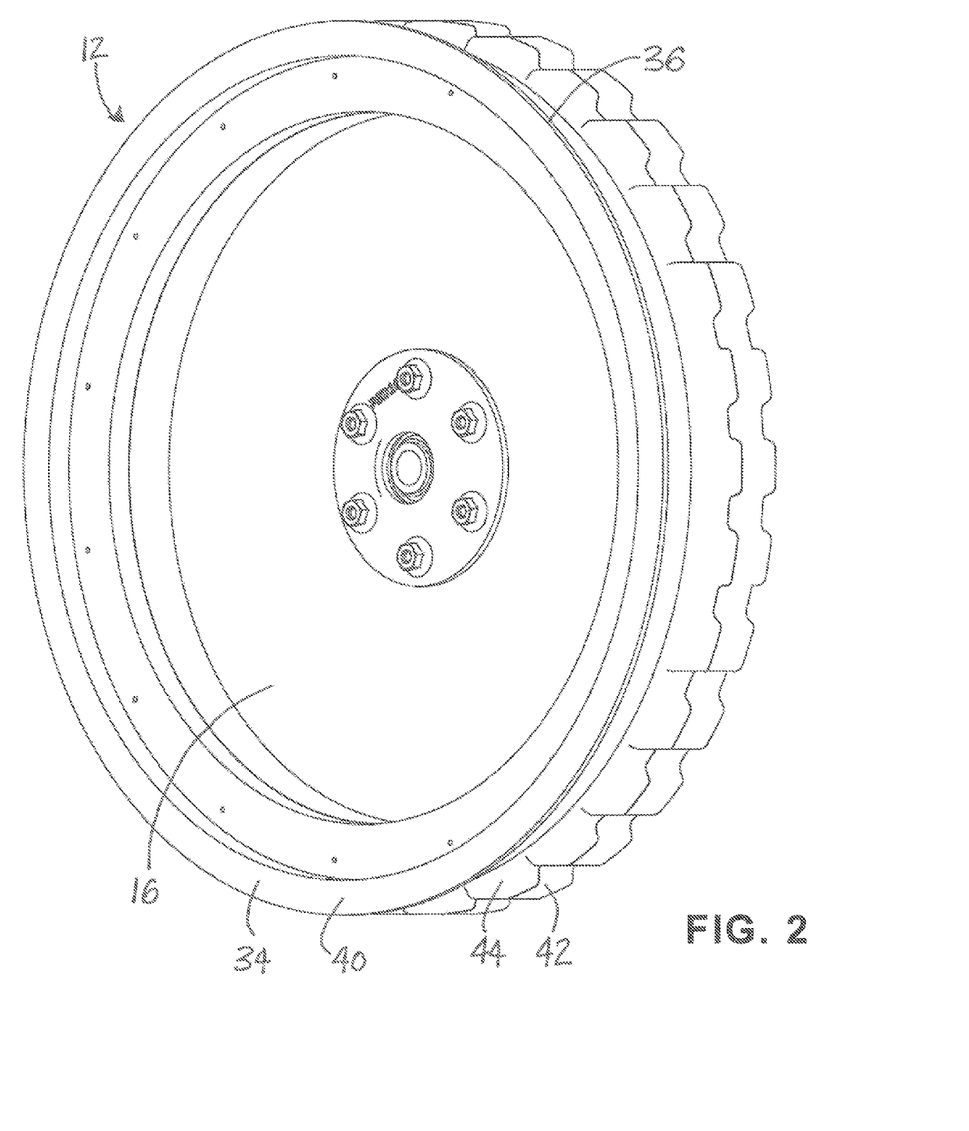
FIG. 2 is a schematic perspective view of the gauge wheel, according to an illustrative embodiment.
Figure 3:
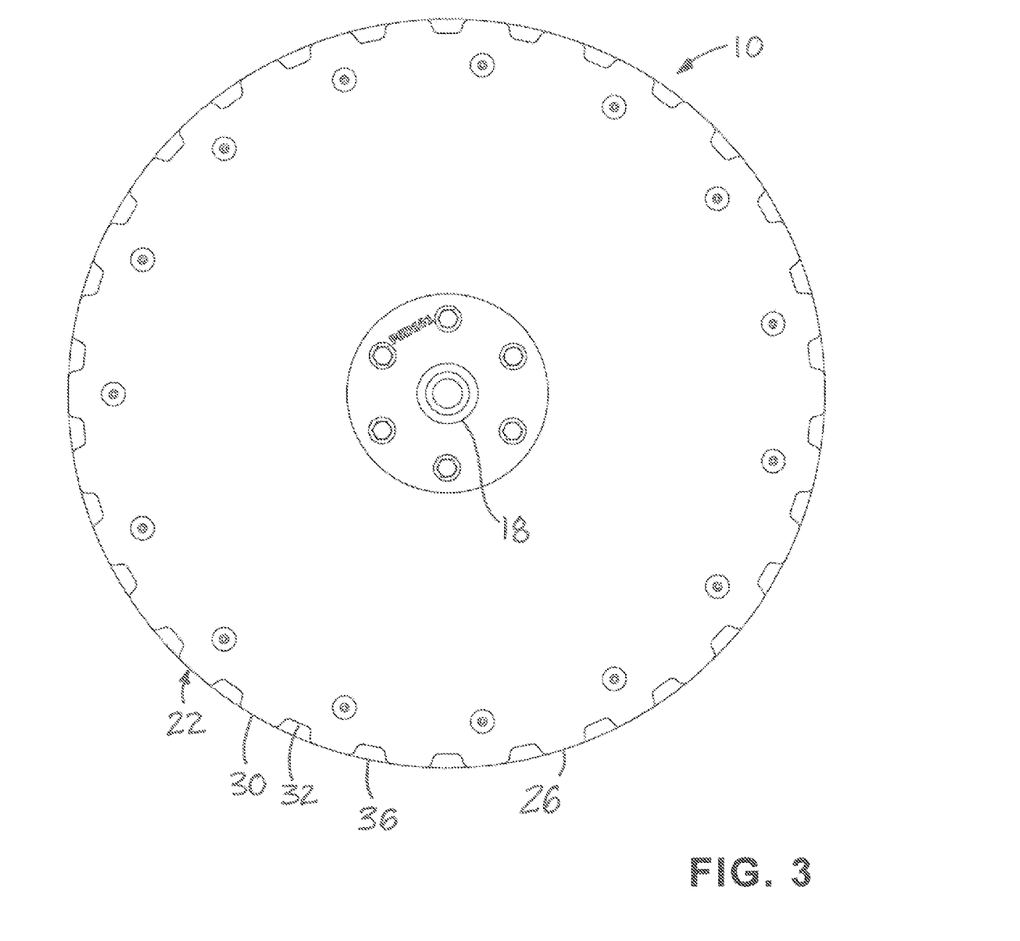
FIG. 3 is a schematic outer side view of the gauge wheel, according to an illustrative embodiment.
Figure 4:
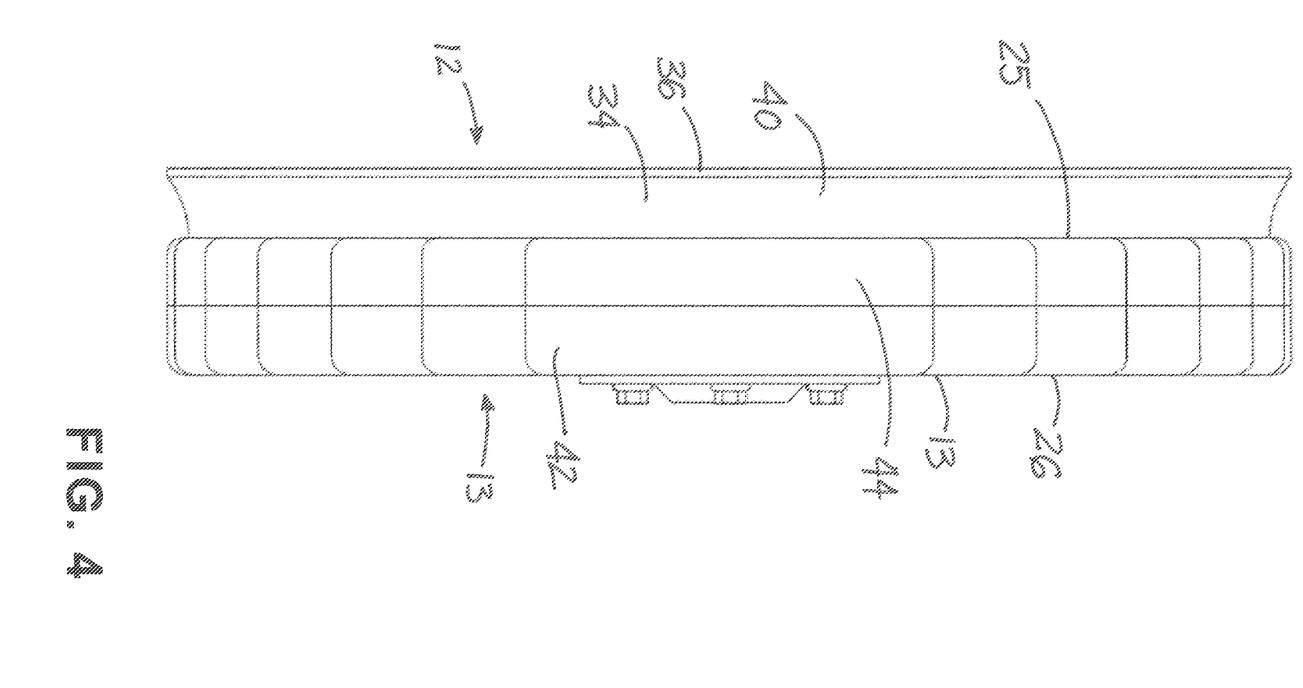
FIG. 4 is a schematic side edge view of the wheel, according to an illustrative embodiment.
Figure 5:
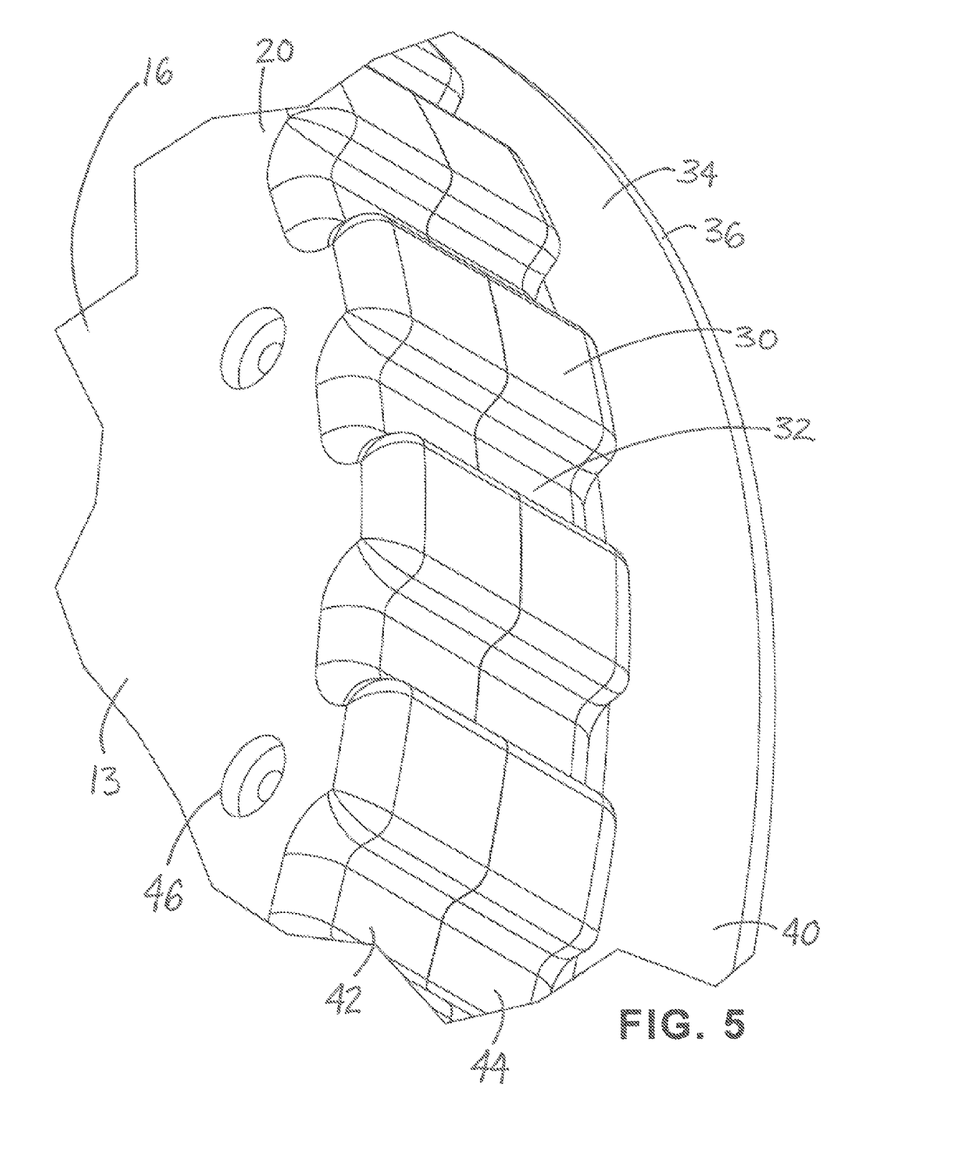
FIG. 5 is a schematic perspective view of a broken away portion of the gauge wheel, according to an illustrative embodiment.
Figure 6:
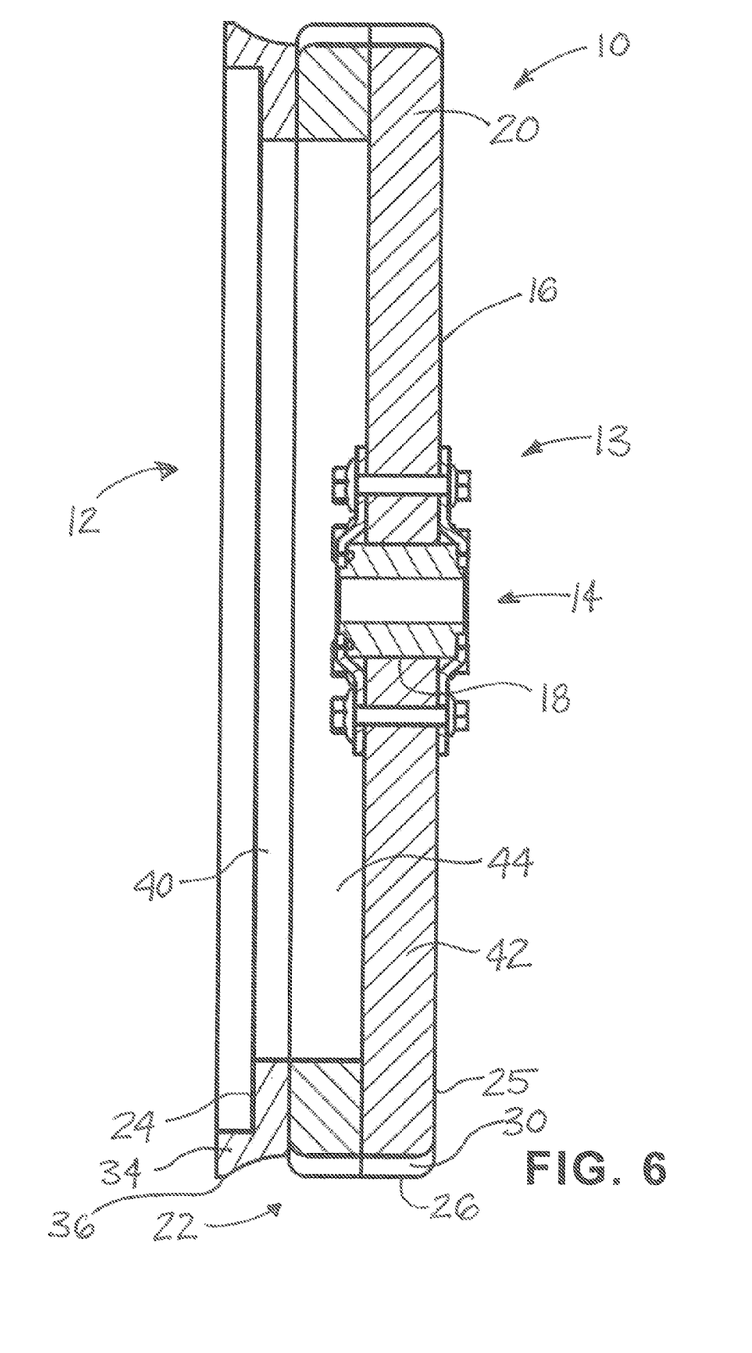
FIG. 6 is a schematic sectional view of the gauge wheel, according to an illustrative embodiment.
Figure 7:
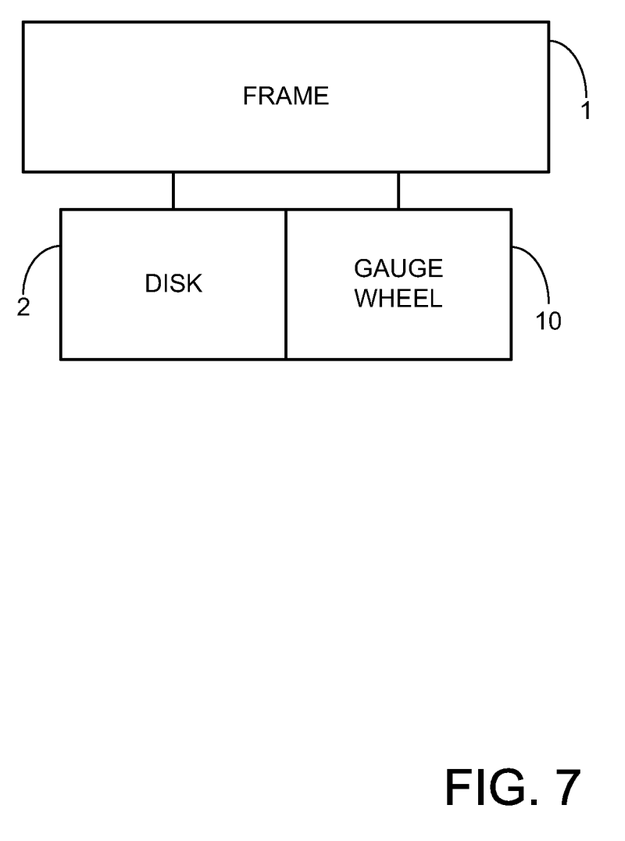
FIG. 7 is a schematic diagram of a planter with the gauge wheel according to an illustrative embodiment.

In one aspect, the disclosure relates to a crop planter 1 that includes a support frame 2 a disk 3 mounted on the frame, and at least one gauge wheel 10 mounted on the frame 2 and described in greater detail below. The disk 3 may be rotatably mounted on the frame, and may have a pair of opposite side surfaces. The gauge wheel 10 may be rotatably mounted on the frame, and may be positioned adjacent to the disk 3. The gauge wheel 10 may be mounted on the frame 2 so that a portion of the gauge wheel contacts the disk, such as one of the opposite side surfaces of the disk.

The gauge wheel 10 has an inner side 12 that may be positioned toward the disk 3 when the wheel 10 is mounted on the planter and an outer side 13 that may be positioned away from the disk 3. When mounted on the frame, portions of the inner side 12 may contact the disk 3 such as one of the side surfaces of the disk. The gauge wheel 10 may have a bearing located at a center 14 of the wheel to permit the wheel 10 to rotate with respect to the frame 2.

The gauge wheel 10 may include a center portion 16 that extends outwardly from the center 14 of the wheel 10. The center portion 16 may have a central hole 18 at the center 14 of the wheel which may accommodate a bearing or at least an axle mounted on the frame 2, and preferably, although not critically, the center portion 16 may be substantially continuous from the center hole 18 outwardly. The wheel 10 may also include a rim portion 20 that is positioned at an outer circumference 22 of the wheel. The rim portion 20 may have an inner surface 24 and an outer surface 25 at the outer side 13. The rim portion 20 may have an outer circumferential surface 26 that generally extends between the inner surface 24 and the outer surface 25 of the wheel. In some embodiments, the center portion 14 may be located toward the outer surface 25 of the gauge wheel 10.

Significantly, a plurality of lugs 30 may be formed on the outer circumferential surface 26 of the rim portion 20 to enhance the traction of the wheel when moved across the surface of a field so that the contact between the wheel and the soil surfaces forces the wheel to rotate with respect to the frame, and not simply slide across the soil surface. The lugs 30 may be separated by valleys 32. Each of the lugs 30 may extend continuously or substantially from the outer surface 25 to the inner surface 24, and each of the valleys 32 may also extend continuously or substantially continuously from the outer surface 25 to the inner surface 24. A portion of the outer circumferential surface on each of the lugs may extend along a circumference of the gauge wheel such that the surface portion is a portion of a cylinder. A portion of the outer circumferential surface 26 on each of the valleys 32 may extend along the circumference of the gauge wheel such that the surface portion is a portion of a cylinder.

The gauge wheel 10 may also include a lip portion 34 for contacting the disk 3, and the lip portion may be on the inner side 12 of the gauge wheel and may extend from the inner surface 24 of the rim portion 20 and away from the inner surface. The lip portion 34 may taper to a thin edge 36 that is annular in shape and that may have a portion that abuts against one of the opposite sides of the disk.

The gauge wheel may also be formed or constructed of separate parts or pieces that may include an inner section 40 that is positioned at the inner side 12 of the gauge wheel 10. The inner section 40 may include the lip portion 34, and may include a portion of the rim portion 20. The gauge wheel 10 may also include an outer section 42 that is positioned at the outer side 13 of the gauge wheel. In some embodiments, the outer section 42 may include and form the center portion, and may include and form a portion of the rim portion. The gauge wheel may further include a medial section 44 that is positioned between the inner 40 and outer 42 sections, and the medial section may include a portion of the rim portion 20.

In some embodiments, the inner section 40 may be connected to the medial section 44, and the outer section 42 may be connected to the medial section. A plurality of connectors may be employed to connect the sections together, including connectors extending through the inner section 40 into the medial section 44 to connect the inner section to the medial section, and connectors extending through the outer section 42 into the medial section 44 to connect the outer section to the medial section. A plurality of holes 46 may be formed in the inner section 40, a plurality of holes may be formed in the outer section 42, and a plurality holes may be formed in the medial section 44. In some illustrative embodiments, the fasteners may be self tapping screws and the holes in the inner 40 and outer 42 sections may be formed to easily allow the fasteners pass through, and the holes in the medial section may be more constricted to require the self-tapping screws to cut threads into the hole.

In another significant aspect of the gauge wheel, the rim portion 20 may be formed of a non-compliant material which is not compliant or flexible in nature and may be substantially rigid in nature. The rim portion and the lip portion of the wheel may both be formed of a non-compliant material. Some highly suitable materials are ultrahigh molecular weight polyethylene, whether machined or molded into the desired form. One highly suitable material is available under the tradename POLYSTONE M (UHMW-PE) available from Rochling Engineering Plastics, 903 Gastonia Technology Parkway, Dallas, N.C. 28034.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

I claim:

1. A crop planter comprising:
   a frame;
   a disk mounted on the frame, the disk being rotatably mounted on the frame, the disk having a pair of opposite side surfaces; and
   a gauge wheel controlling a depth of ground penetration for a disk of a crop planter, the gauge wheel having an inner side positioned toward the disk and an outer side positioned away from the disk, the gauge wheel comprising:
   a center portion extending outwardly from the center of the wheel;
   a rim portion positioned at an outer circumference of the wheel, the rim portion having an inner surface and an outer surface at the outer side of the wheel, the rim portion having an outer circumferential surface extending between the inner surface and the outer surface of the wheel and extending along the outer circumference of the wheel; and
   a lip portion contacting at least a portion of a side of the disk, the lip portion being on the inner side of the gauge wheel and extending from the inner surface of the rim portion, the lip portion tapering to a thin edge away from the inner surface;
   wherein a plurality of lugs are formed on the outer circumferential surface of the rim portion with the lugs being separated by valleys to cause the ground surface to rotate the wheel;
   wherein the rim portion and the lip portion of the wheel are formed of a rigid material;
   wherein at least one of the lugs extends continuously from the outer surface of the rim portion to the inner surface of the rim portion; and
   wherein at least one of the valleys extends continuously from the outer surface of the rim portion to the inner surface of the rim portion.

* * * * *